(12) United States Patent
Sasaki

(10) Patent No.: US 7,566,828 B2
(45) Date of Patent: Jul. 28, 2009

(54) POWER SOURCE DEVICE AND CHARGE CONTROLLING METHOD TO BE USED IN SAME

(75) Inventor: Hiroshi Sasaki, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 642 days.

(21) Appl. No.: 11/127,296

(22) Filed: May 12, 2005

(65) Prior Publication Data
US 2005/0252546 A1   Nov. 17, 2005

(30) Foreign Application Priority Data
May 14, 2004   (JP)   ............... 2004-145705

(51) Int. Cl.
H01L 25/00 (2006.01)
H02J 7/00 (2006.01)
G05F 1/00 (2006.01)

(52) U.S. Cl. ............... 136/243; 136/293; 320/134; 323/201

(58) Field of Classification Search .......... None
See application file for complete search history.

(56) References Cited

U.S. PATENT DOCUMENTS

2005/0045225 A1 * 3/2005 Sekine .................. 136/291

FOREIGN PATENT DOCUMENTS

| CN | 97113827.3 | 1/1998 |
|---|---|---|
| JP | 8-79984 | 3/1996 |
| JP | 2001-45677 | 2/2001 |
| JP | 2002-238182 | 8/2002 |
| JP | 2004-64855 | 2/2004 |
| KR | 1998-059253 | 10/1998 |
| KR | 20-0273726 | 4/2002 |

OTHER PUBLICATIONS

Miyoshi, JP 2004-064855A, online translation, Feb. 26, 2004.*
Kazuhiro, JP 2001-045677A, online translation, Feb. 16, 2001.*
Lee, KR 20-0273726, online translation, Apr. 27, 2002.*

(Continued)

Primary Examiner—Alexa D Neckel
Assistant Examiner—Shannon Gardner
(74) Attorney, Agent, or Firm—Whitham Curtis Christofferson & Cook, P.C.

(57) ABSTRACT

A power source device is provided which is capable of charging a secondary cell in a stable manner even in an environment in which power generated by a solar cell varies due to changes in sunlight intensity and/or ambient temperatures. By power generated by a solar cell module, an electric double-layer capacitor is charged and, by using a charging voltage of the electric double-layer capacitor, a booster-type DC-DC (Direct Current-Direct Current) converter is driven. A charge on/off controlling circuit detects the voltage of the electric double-layer capacitor and, when the voltage exceeds a high level threshold voltage, keeps a charge controlling signal (output signal from a terminal) in an active mode and performs a charge starting operation and, after that, when the voltage of the electric double-layer capacitor reaches a low level threshold value, holds the charge controlling signal in a non-active mode and performs a charge stopping operation.

6 Claims, 9 Drawing Sheets

OTHER PUBLICATIONS

Korean Patent Office office action issued Nov. 7, 2006, Japanese translation of Korean office action, English translation of relevant portions.
The Office Action issued by the Japanese Patent Office on Oct. 9, 2007, with English language translation, pp. 1 to 5.

The Office Action issued by the Chinese Patent Office on Feb. 9, 2007, with Japanese and English language translations, pp. 1-15.

* cited by examiner

Daily change in amounts of power generation occuring
When solar cells are placed horizontallly relative to ground

| S | R | Q | State of gate switch 82 |
|---|---|---|---|
| L | L | Held | Held |
| L | H | L | OFF |
| H | L | H | ON |
| H | H | Disabled | — |

POWER SOURCE DEVICE AND CHARGE CONTROLLING METHOD TO BE USED IN SAME

BACKGROUND OF THE INVENTION

1. Field of the Invention

The present invention relates to a power source device and a charge controlling method to be used in the power source device, and more particularly to the power source device in which electric power generated by a solar cell is temporarily stored in an electric double-layer capacitor and which has a secondary cell to be charged based upon the electric power stored in the electric double-layer capacitor and which is suitably used, for example, even in a place where power infrastructure is not provided, and to the charge controlling method to be used in the above power source device.

The present application claims priority of Japanese Patent Application No. 2004-145705 filed on May 14, 2004, which is hereby incorporated by reference.

2. Description of the Related Art

A power source device having a secondary cell to be charged by a solar cell that converts solar light energy into electricity is being used as a power source for electronic devices or a like in a place where power infrastructure is not provided. However, the conventional power source device presents a problem in that power to be generated by the solar cell is not stable due to changes in the surrounding environments such as variations in intensity of sunlight (solar irradiation) and in ambient temperatures. To solve these problems, a power source device to improve such problems as described above is proposed.

One of such conventional power source devices is disclosed, for example, in Japanese Patent Application Laid-open No. 2002-238182 (See Page 1, FIG. 1 within the same Patent Document) in which a solar cell and an electric double-layer capacitor are connected in parallel and a diode array to produce a reference voltage used to determine an operating point of the solar cell is placed very near to the solar cell and, as a result, the diode array and the solar cell are thermally coupled, which makes the reference voltage value coincide with a temperature characteristic of the solar cell. As a result, the operating point of the solar cell becomes a most suitable operating point at which maximum efficiency is obtained and, while the operating point is sequentially corrected so as to respond to a change in the most suitable operating point caused by a change in temperature of the solar cell, a battery is charged through a switching device and a constant current DC (Direct Current)-DC converter.

However, the above conventional power source device has the following problems. That is, for example, in the above conventional power source device, if the solar cell is mounted in a place being far from the power source device, since a circuit to produce the reference voltage is separated from the power source device, an electric wiring between the circuit to produce the reference voltage and the power source device is made long and as a result, appearance of electric noises and a voltage drop caused by wiring resistance occur, which cause accuracy of the reference voltage to be degraded and the operating point of the solar cell not to be at the optimum value. Another problem is that, if the battery, having a single-piece construction such that the solar cell and the power source device are integrated together, is placed outdoors, a temperature of the battery exceeds its upper limit in a use temperature range, in a high temperature environment, for example, in a state of mid-summer with no breeze and, as a result, there is a risk that the battery produces heat or breakdown. Moreover, in the case of constant-current charging in a low temperature environment, there is a possibility that charging efficiency decreases due to an increase in internal impedance of the battery itself. Furthermore, even when only the battery is put indoors to moderate temperature environments, there is a possibility that a decrease in efficiency in the constant-current charging occurs due to an increase in resistance of wirings to connect the battery to the power source device.

There is still another problem in that, when electric power generated by the solar cell is low in such a state in which the intensity of sunlight is low in the morning or the evening, on a cloudy day, or a like, a long time is required to increase a charging voltage up to the most suitable operating point due to a leak current in the electric double-layer capacitor or to power consumed in a static state in internal circuits of the power source device and a period required to put the switching device in an ON state is made long, which causes the charging efficiency to be degraded.

SUMMARY OF THE INVENTION

In view of the above, it is an object of the present invention to provide a power source device which is capable of charging a secondary cell in a stable manner even in a state in which power generated by a solar cell varies due to changes in intensity of sunlight (solar irradiation) and/or in ambient temperature, and also capable of charging a secondary cell with high efficiency without being affected by impedance of the secondary cell and wirings.

According to a first aspect of the present invention, there is provided a power source device including:

at least one solar cell;

a power storing section to be charged by electromotive force produced by the solar cell and to store electricity;

a secondary cell to be charged by the electricity being stored in the power storing section;

a voltage detecting section to detect the voltage of the power storing section and, when the voltage of the power storing section exceeds a high level threshold voltage, holds a charge controlling signal being used to charge the secondary cell in an active mode and performs a charge starting operation and, after that, when the voltage of the power storing section reaches a low level threshold voltage, holds the charge controlling signal in a non-active mode and performs a charge stopping operation; and a charge controlling section to charge the secondary cell, when the charge controlling signal is in the active mode, based upon the electricity being stored in the power storing section.

In the foregoing, a preferable mode is one wherein the voltage detecting section includes:

a first comparator to compare the voltage of the power storing section with the high level threshold voltage and to output a first comparison result;

a second comparator to compare the voltage of the power storing section with the low level threshold voltage and to output a second comparison result; and a holding circuit to hold the charge controlling signal in the active mode or in the non-active mode according to the first comparison result or the second comparison result.

Also, a preferable mode is one wherein the charge controlling section includes:

a switching unit to be turned ON when the charge controlling signal is in the active mode and to charge the secondary cell based upon the electricity being stored in the power storing section;

a constant current charge controlling unit to charge the secondary cell at a specified constant current when voltage of the secondary cell is lower than a specified threshold voltage; and a constant voltage charge controlling unit to charge the secondary cell at a specified constant voltage when the voltage of the secondary cell exceeds the specified threshold voltage.

Also, a preferable mode is one wherein the power storing section includes:

an electric double-layer capacitor;

wherein internal impedance of the electric double-layer capacitor is set to be lower than that of the solar cell.

Also, a preferable mode is one that wherein further includes:

an auxiliary power storing section; and an auxiliary voltage detecting section to charge the auxiliary power storing section by the electromotive force of the solar cell when the charge controlling signal is in the active mode and, when voltage of the auxiliary power storing section exceeds the high level threshold voltage, applies the voltage of the auxiliary power storing section, instead of the voltage of the power storing section, to the voltage detecting section to make the voltage detecting section detect the voltage.

An additional preferable mode is one wherein the auxiliary power storing section includes:

an electric double-layer capacitor; wherein internal impedance of the electric double-layer capacitor is set to be lower than that of the solar cell.

According to a second aspect of the present invention, there is provided a charge controlling method to be used in a power source device which includes at least one solar cell, a power storing section to be charged by electromotive force produced by the solar cell and to store electricity, and a secondary cell to be charged by the electricity being stored in the power storing section, the control method including:

detecting the voltage of the power storing section, holding a charge controlling signal being used to charge the secondary cell in an active mode and performing a charge starting operation when the voltage of the power storing section exceeds a high level threshold voltage and, after that, holding the charge controlling signal in a non-active mode and performing a charge stopping operation when the voltage of the power storing section reaches a low level threshold voltage, and charging the secondary cell based upon the electricity being stored in the power storing section when the charge controlling signal is in the active mode.

According to a third aspect of the present invention, there is provided a power source device including:

at least one solar cell;

a power storing section to be charged by electromotive force produced by the solar cell and to store electricity;

a secondary cell to be charged by the electricity being stored in the power storing section;

a charge on/off controlling section to detect the voltage of the power storing section and, when the voltage of the power storing section exceeds a high level threshold voltage, changes and holds a charge controlling signal being used to charge the secondary cell from an active mode to a non-active mode and performs a charge starting operation and, after that, when the voltage of the power storing section reaches a low level threshold voltage, changes and holds the charge controlling signal from the active mode to the non-active mode and performs a charge stopping operation; and a charge controlling section to charge the secondary cell, when the charge controlling signal is in the active mode, based upon the electricity being stored in the power storing section.

With the above configurations, the voltage detecting section detects the voltage being stored in the power storing section and, when the voltage exceeds the high level threshold voltage, holds the charge controlling signal used to charge the secondary cell in the active mode and performs the charge starting operation. After that, when the voltage of the power storing section becomes the low level threshold voltage, the voltage detecting section holds the charge controlling signal in the non-active mode and performs the charge stopping operation. The charge controlling section, when the charge controlling signal is in the active mode, charges the secondary cell based upon the power stored in the power storing section. Therefore, even in an environment in which the power generated by the solar cell varies due to changes in sunlight intensity and/or in ambient temperature, the secondary cell can be charged in a stable manner. Also, it is not necessary that the first and second comparators are placed near to the solar cell and, therefore, the comparators are not affected by ambient temperatures, which enables highly accurate detection of the voltage by generation of an accurate high level threshold voltage and accurate low level threshold voltage. Also, when the voltage of the secondary cell is lower than the specified threshold voltage, the constant current charge controlling unit charges the secondary cell at a specified current and, when the voltage of the secondary cell exceeds the specified threshold voltage, the constant voltage charge controlling unit charges the secondary cell at a specified constant voltage and, therefore, the secondary cell can be charged with high efficiency without being affected by impedance of the secondary cell and wirings. Furthermore, when the charge controlling signal is in the active mode, the auxiliary voltage detecting section charges the auxiliary power storing section by the electromotive force of the solar cell and, when the voltage of the auxiliary power storing section exceeds the high level threshold voltage, the voltage of the auxiliary power storing section, instead of the voltage of the power storing section, is fed to the voltage detecting section for detection of the voltage, more effective charging of the secondary cell is made possible.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. According to the present invention, a power source device is provided which is so configured to detect voltage of an electric double-layer capacitor to be charged by electromotive force generated by a solar cell and, when the voltage exceeds a high-level threshold value, to keep a charge controlling signal to charge a secondary cell in an active mode and to perform an operation of starting to charge the secondary cell and, after that, when the voltage of the electric double-layer capacitor reaches a low-level threshold voltage, to keep the charge controlling signal in a non-active mode and to stop the charging operation and, when the charge controlling signal is in an active mode, to charge the secondary cell based upon power stored in the electric double-layer capacitor.

First Embodiment

Figure 1:
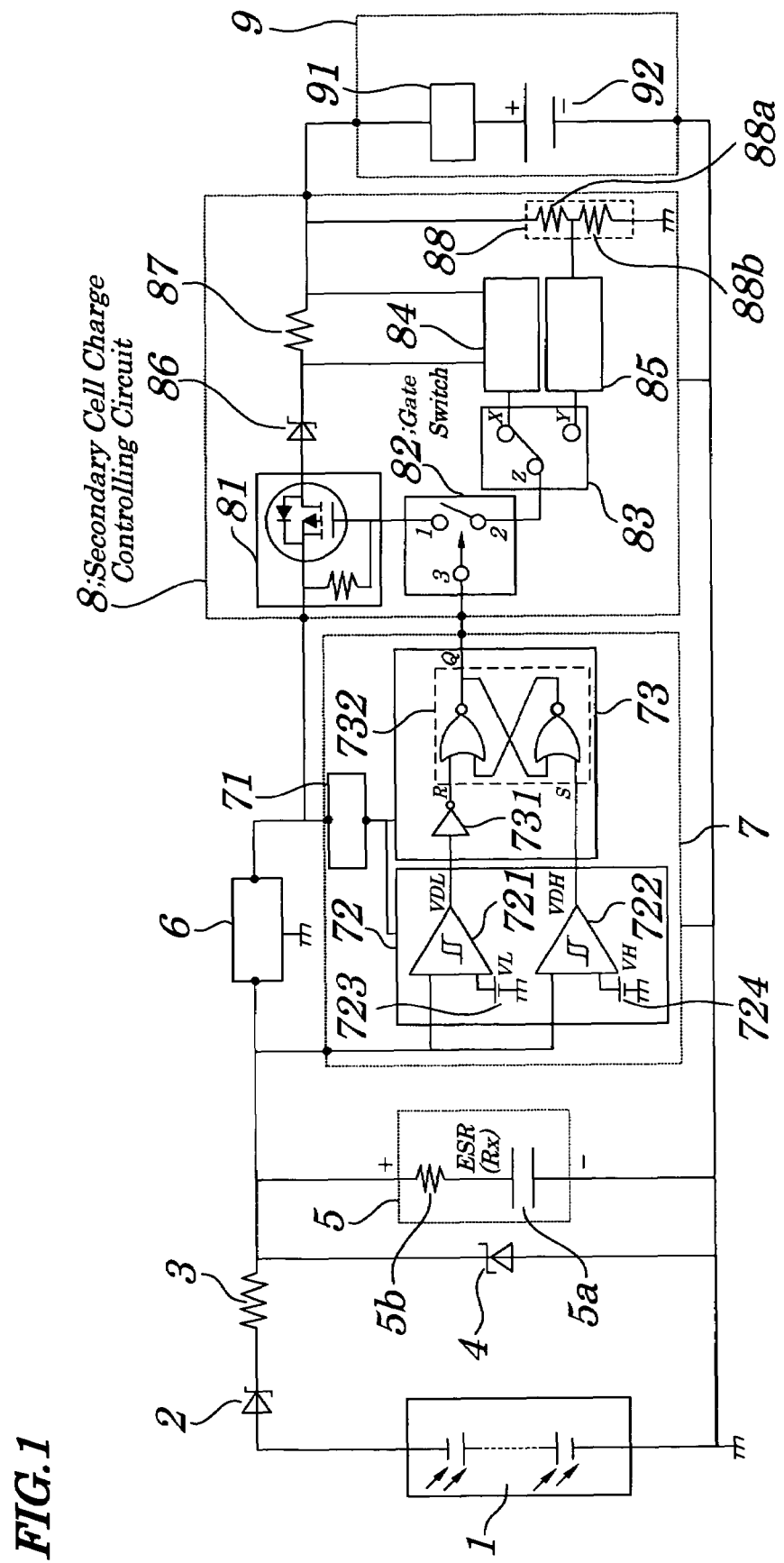
FIG. 1 is a schematic circuit diagram illustrating electrical configurations of a power source device according to a first embodiment of the present invention.
Figure 3:
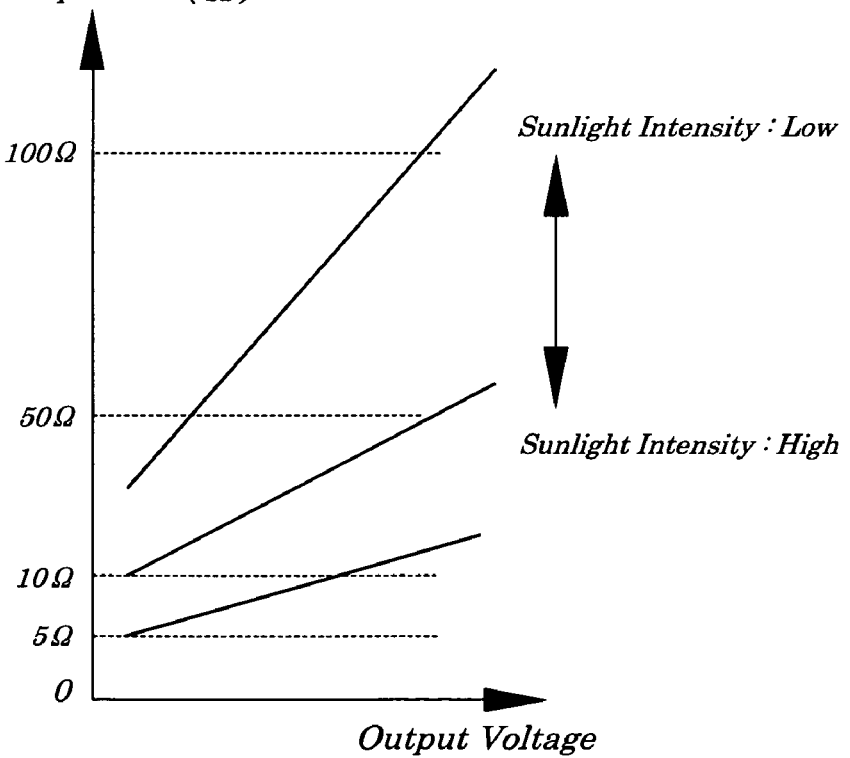
FIG. 3 is a graph showing an output impedance characteristic that changes in a manner to correspond to intensity of sunlight applied to the solar cell module of FIG. 1.
Figure 4:
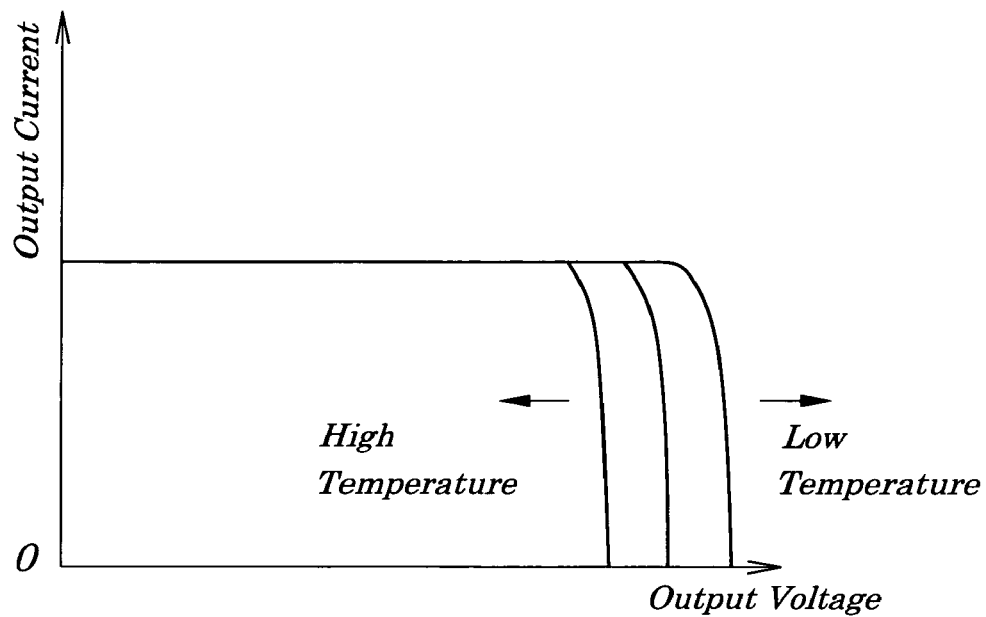
FIG. 4 is a graph showing a temperature characteristic of the solar cell module of FIG. 1.

FIG. 1 is a circuit diagram illustrating electrical configurations of a power source device of a first embodiment of the present invention. The power source device, as shown in FIG. 1, includes a solar cell module 1, a first reverse-current preventing element (device) 2, a current limiting element 3, an overvoltage protecting element (device) 4, an electric double-layer capacitor 5, a booster-type DC (Direct Current)-DC converter 6, a charge on/off controlling circuit 7, a secondary cell charge controlling circuit 8, and a secondary cell pack 9. The solar cell module 1 is made up of a plurality of solar cells being connected (placed) in series and/or in parallel to directly convert sun energy into electrical energy. In the embodiment in particular, the solar cell module 1 is constructed by combining solar cells formed on a substrate made of a silicon semiconductor or a compound semiconductor being arranged in a planar manner and has an output characteristic as shown in FIG. 2, an output impedance characteristic as shown in FIG. 3, and a temperature characteristic as shown in FIG. 4.

Figure 2:
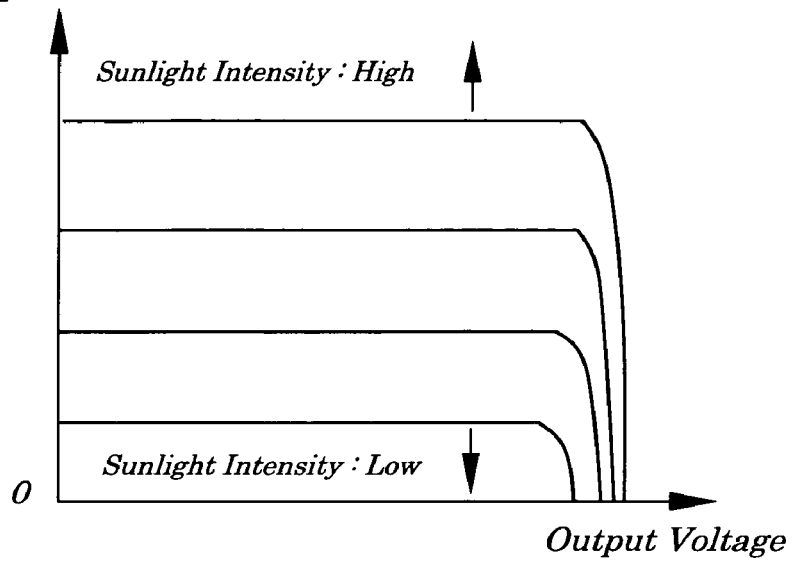
FIG. 2 is a graph showing an output characteristic that changes in a manner to correspond to intensity of sunlight applied to a solar cell module of FIG. 1.
Figure 5:
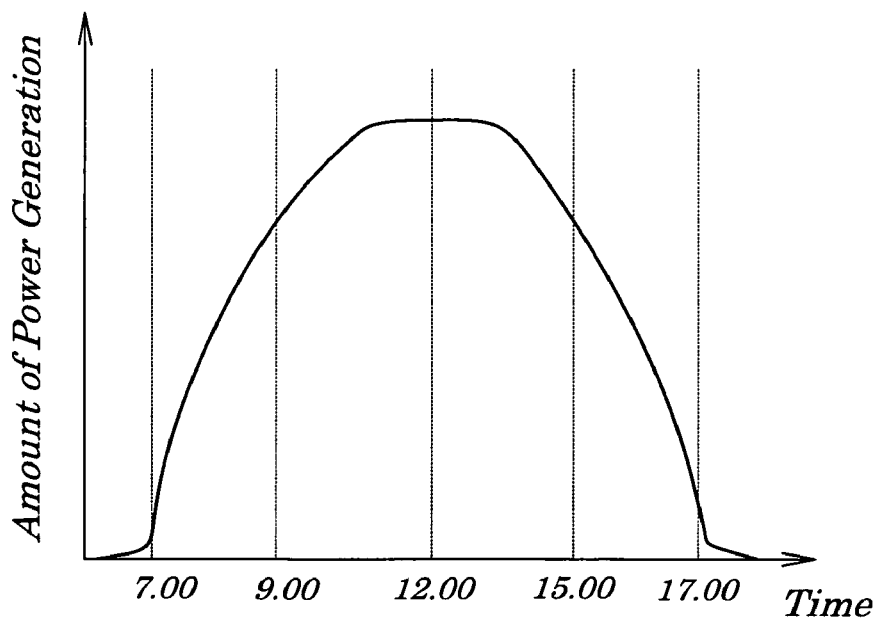
FIG. 5 is a graph showing a daily change in amounts of power generation by the solar cell module of FIG. 1 being placed in a fixed state.

That is, in the solar cell module 1, as shown in FIG. 2, an output current changes depending on intensity of sunlight applied to the solar cells and, particularly, the higher the intensity of sunlight becomes, the larger the output current becomes and, as the intensity of sunlight becomes higher, the output voltage reaches a saturated level. The solar cell module 1, as shown in FIG. 3, has an output impedance characteristic having correlation to the intensity of sunlight derived from an output characteristic as shown in FIG. 2. For example, output impedance of the solar cell module 1 of a 0.8 W (watts)—type is about 5Ω at the minimum even when the sunlight intensity is high and, if the intensity of sunlight is low, varies in a range of 100Ω or more and is in the order of several tens Ω at a practical output voltage. As shown in FIG. 4, the output voltage of the solar cell module 1 varies in a manner to correspond to a change in ambient temperatures of the solar cell module 1 and, when the intensity of sunlight is at the same level in particular, the higher the temperature becomes, the lower the output voltage becomes and the lower the temperature becomes, the higher the output voltage becomes. Moreover, if the planar solar cell module 1 is placed on the ground or in a building in a fixed state in one direction, as shown in FIG. 5, the intensity with which sunlight is applied to the solar cells changes with the passage of time due to a change in a position of the sun caused by the Earth's rotation and, therefore, an amount of power generated by the solar cell module 1 also changes with the passage of time according to the output characteristic shown in FIG. 2.

The first reverse-current preventing element 2 is made up of, for example, a Schottky diode that produces a low forward voltage and, when an output voltage from the solar cell module 1 decreases due to operations in a dark place or at night, prevents a breakdown of the solar cell module 1 caused by a reverse-current fed from a back-stage circuit (electric double-layer capacitor 5). The current limiting element 3 is made up of, for example, a resistor with resistance of several ohms or so and, when a solar cell module having a very high power-generating capability for the solar cell module 1 is used as a power source or when a direct-current stabilizing power source is temporarily used as the power source, limits an in-rush current into the electric double-layer capacitor 5 and back-stage circuits. The overvoltage protecting element 4 is made up of, for example, a constant voltage diode and, when a voltage output from the solar cell module 1 exceeds a withstand voltage of the electric double-layer capacitor 5, limits a voltage applied to the electric double-layer capacitor 5 to a specified constant voltage to protect the electric double-layer capacitor 5 from degradation in characteristics such as an increase in ESR (Equivalent Series Resistance) of the electric double-layer capacitor 5 caused by overvoltage stress and/or its volume expansion and from breakdown of related elements.

The electric double-layer capacitor 5 has a characteristic of being low in ESR by being so configured as to be of a water-type in which a diluted sulfuric acid is used as an electrolysis solution or to be of an organic-type in which an organic electrolysis solution is used. Now, let it be assumed that an ESR 5b of the electric double-layer capacitor 5 is "Rx" (resistance value) and its electrostatic capacitance 5a is "Cx" (capacitance). If an element area of the electric double-layer capacitor 5 is about 20 mm×30 mm, its withstand voltage is about 5V, the "Rx" is 200 mΩ or less, and the "Cx" is 30 mF or more. Therefore, high output impedance of the solar cell module 1, as being in the order of tens of ohms, is converted into low impedance being in the order of mΩ being less than 1Ω and an amount of electricity being equivalent to a product of the capacitance Cx and a charging voltage of the electric double-layer capacitor 5 is stored and, as a result, electric energy generated by the solar cell module 1 can be used as a low impedance power source.

The booster-type DC-DC converter 6 is made up of switching regulators (not shown) and is used as a power source of the secondary cell charge controlling circuit 8 to charge a lithium ion secondary cell 92 and of an LDO (Low Drop Out) regulator 71 in the charge on/off controlling circuit 7. In order to discharge charged energy of the electric double-layer capacitor 5 with high efficiency, it is necessary that the booster-type DC-DC converter 6 has a high voltage-boosting ratio. More particularly, to achieve highly effective charging of the charged energy of the electric double-layer capacitor 5 even at a high voltage-boosting ratio being three times larger than an input voltage, a boosting operation is performed by using a PWM (Pulse Width Modulation) method, a PFM (Pulse Frequency Modulation) method, a method obtained by combining these methods, a synchronous rectification method, or a like.

Figures 6, 7:
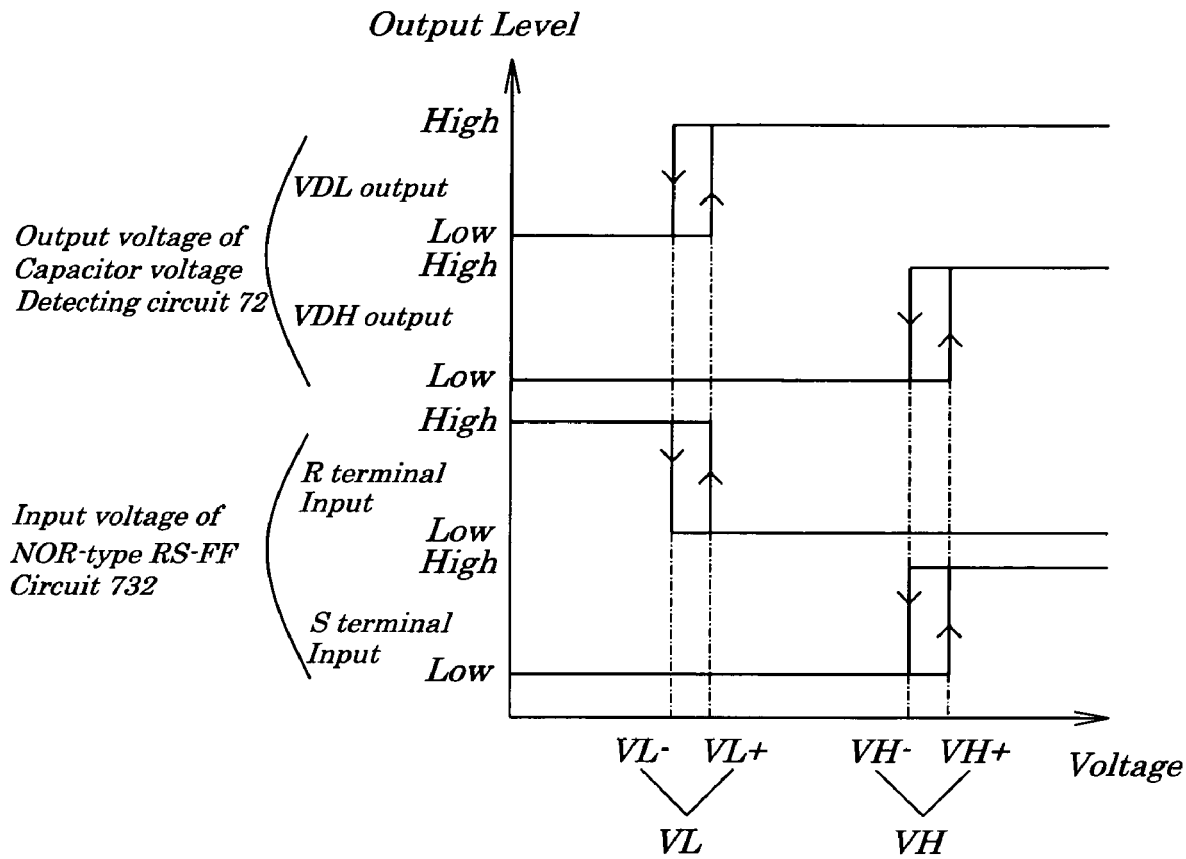
FIG. 6 is a diagram explaining operations of a charge on/off controlling circuit.
FIG. 7 is a table showing a truth value of a NOR-type RS-FF (Reset-Flip Flop) circuit.

The charge on/off controlling circuit 7 includes the LDO regulator 71, a capacitor voltage detecting circuit 72, and a gate switch controlling circuit 73. The LDO regulator 71 is a step-down type power circuit to provide the capacitor voltage detecting circuit 72 and the gate switch controlling circuit 73 with a power. The capacitor voltage detecting circuit 72 includes a low voltage detector 721, a high voltage detector 722, a reference voltage source 723, and a reference voltage source 724. In the low voltage detector 721, a threshold voltage "VL" (low level threshold voltage) is set by the reference voltage source 723 and, as shown in FIG. 6, when the charging voltage of the electric double-layer capacitor 5 is lower than the threshold voltage "VL", a Low signal (having a low level) is output from an output terminal VDL of the low voltage detector 721 and, when the charging voltage of the electric double-layer capacitor 5 is higher than the threshold voltage "VL", a High signal (having a high level) is output from an output terminal VDH of the high voltage detector 722. At this time, the threshold voltage "VL" has a hysteresis in a range between VL(−) and VL(+). In the high voltage detector 722, a threshold voltage "VH" (high level threshold voltage) is set (VL<VH) and, when the charging voltage of the electric double-layer capacitor 5 is lower than the threshold voltage "VH", a Low signal is output from the output terminal VDL of the low voltage detector 721 and when the charging voltage of the electric double-layer capacitor 5 is higher than the threshold voltage "VH" a High signal is output from the output terminal VDH of the high voltage detector 722. At this time, the threshold voltage "VH" has a hysteresis in a range between VH(−) and VH(+). Signals from the output terminals VDL and VDH are transmitted to the gate switch controlling circuit 73.

The gate switch controlling circuit 73 is made up of an inverter (INV) circuit 731 and a NOR-type RS-FF circuit 732. The VDL output signal is inverted by the INV circuit 731 and the inverted signal is transmitted to a terminal "R" (reset terminal) of the NOR-type RS-FF circuit 732 that performs operations of a flip-flop circuit and the VDH output signal is transmitted directly to a terminal "S" (set terminal) of the NOR-type RS-FF circuit 732. By configuring the circuits as above, a signal obtained by reversing a result from an operation of a comparator using a threshold voltage "VL" as a reference is transmitted to the terminal "R" and, more specifically, when a charging voltage of the electric double-layer capacitor 5 is lower than the threshold voltage "VL", a High signal is transmitted to the terminal "R" and, when the charging voltage exceeds the threshold voltage "VL", a Low signal is transmitted to the terminal "R". Moreover, to the terminal "S" is transmitted a signal obtained by using a result from operations of the comparator using a threshold voltage "VH" as a reference and, more particularly, when a charging voltage of the electric double-layer capacitor 5 is lower than the threshold voltage "VH", a Low signal is transmitted to the terminal "S" and, when the charging voltage exceeds the threshold voltage "VH", a High signal is transmitted to the terminal "S".

The NOR-type RS-FF circuit 732 performs operations of a NOR-gate type reset-set flip-flop circuit and exercises an ON-OFF control between contact "1" and contact "2" in a gate switch 82 according to a signal output from a terminal "Q" to be transmitted through a control terminal "3" of the gate switch 82 connected to the terminal "Q". In this case, as an initial state, when a charging voltage of the electric double-layer capacitor 5 is an intermediate voltage between threshold voltages VL and VH and, while the contact "1" is being connected to the contact "2", if the charging voltage of the electric double-layer capacitor 5 drops and reaches the threshold voltage "VL", a signal output from the terminal "Q" becomes low level and, as shown in FIG. 7, the contact "1" in the gate switch 82 is disconnected (OFF) from its contact "2". Then, when the charging voltage starts to be boosted with the gate switch 82 being kept in the OFF state and the charging voltage reaches a threshold voltage "VH", a signal output from the terminal "Q" becomes high level and the contact "1" is again connected (ON) to the contact "2" and, when the charging voltage of the electric double-layer capacitor 5 again starts to drop with the gate switch 82 being held in the ON state and reaches the threshold voltage "VL", the contact "1" is again disconnected (OFF) to the contact "2" and the gate switch 82 is held in the OFF state until the charging voltage is boosted up to the threshold voltage "VH". Thus, by controlling a charging voltage of the electric double-layer capacitor 5 using two kinds of threshold voltages, operations of holding the gate switch 82 in an ON or OFF state are performed.

The secondary cell charge controlling circuit 8 includes a charge controlling switch 81, the gate switch 82, a charging method selecting switch 83, a CC (Constant Current) charge controlling circuit 84, a CV (Constant Voltage) charge controlling circuit 85, a second reverse-current preventing element (device) 86, a charging current detecting element 87, and a charging voltage detecting element 88. The charge controlling switch 81 is made up of a pMOS (p-channel Metal Oxide Semiconductor) transistor. The gate switch 82 has the contact "1" to which both a control terminal to which a terminal "Q" of the NOR-type RS-FF circuit 732 is connected and a gate of the charge controlling switch 81 are connected and the contact "2" to which the charging method selecting switch 83 is connected. The charging method selecting switch 83 has a contact "z" to which the contact "2" in the gate switch 82 is connected, a contact "x" to which the CC charge controlling circuit 84 is connected, and a contact "y" to which the CV charge controlling circuit 85 is connected. The charging method selecting switch 83 has also a charge voltage detecting means or device (not shown) to connect the contact "z" to the contact "x" when a charging voltage is lower than a specified voltage and to connect the contact "z" to the contact "y" when the charging voltage exceeds the specified voltage.

The CC charge controlling circuit 84 controls a current level of a gate of the charge controlling switch 81 so that a charging current to be detected by the charging current detecting element 87 becomes a specified constant current. The CV charge controlling circuit 85 controls a voltage level of the gate of the charge controlling switch 81 so that a charging current to be detected by the charging voltage detecting element 88 becomes a specified constant voltage. The second reverse-current preventing element 86 is made up of, for example, a Schottky diode that produces a low forward voltage and prevents a breakdown of the charge controlling switch 81 caused by a reverse-current fed from a secondary cell pack 9. The charging current detecting element 87 is made up of resistors and detects a charging current. The charging voltage detecting element 88 includes resistors 88a and 88b both being connected in series and divides the charging voltage by the resistors 88a and 88b and detects the divided voltage.

The gate switch 82 is put into either of a state in which its contact "1" is connected to its contact "2" or a state in which its contact "1" is disconnected to its contact "2" and the charging method selecting switch 83 is put into a state in which its common contact "z" is connected, all the time, to either of its contact "x" or "y". Therefore, the secondary cell charge controlling circuit 8 is put in states of three types of operations depending on a state of the switches including the gate switch 82 and the charging method selecting switch 83. That is, in the first switching operations, when the contact "1" in the gate switch 82 is disconnected to its contact "2", a gate-source voltage in the charge controlling switch 81 is zero, which causes a source-drain voltage to be zero and, as a result, the secondary cell pack 9 is not discharged.

In the second switching operation, when the contact "1" and contact "2" in the gate switch 82 are connected to each other and the contacts "z" and "x" in the charging method selecting switch 83 are connected to each other, the gate electrode of the charge controlling switch 81 is connected to the CC charge controlling circuit 84 which causes the secondary cell pack 9 to be charged under preset constant current so that a constant current flows to the charging current detecting element 87.

In the third switching operation, when the contact "1" and contact "2" in the gate switch 82 are connected to each other and the contacts "z" and "y" in the charging method selecting switch 83 are connected to each other, the gate electrode of the charge controlling switch 81 is connected to the CV charge controlling circuit 85 which causes the secondary cell pack 9 to be charged under a preset voltage so that a constant voltage generates to the charging voltage detecting element 88.

The secondary cell pack 9 is made up of a charge/discharge protecting circuit 91 and the lithium ion secondary cell 92. The charge/discharge protecting circuit 91 protects the lithium ion secondary cell 92 from overcharge by the secondary cell charge controlling circuit 8, from overdischarge caused by excess supply of power to loads, overcurrent caused by a failure of a short circuit in a load and/or in a control circuit and, by disconnection on a positive side of the lithium ion secondary cell 92, separates the lithium ion secondary cell 92 from the secondary cell charge controlling circuit 8 and from loads for protection of the lithium ion secondary cell 92.

Figure 8:
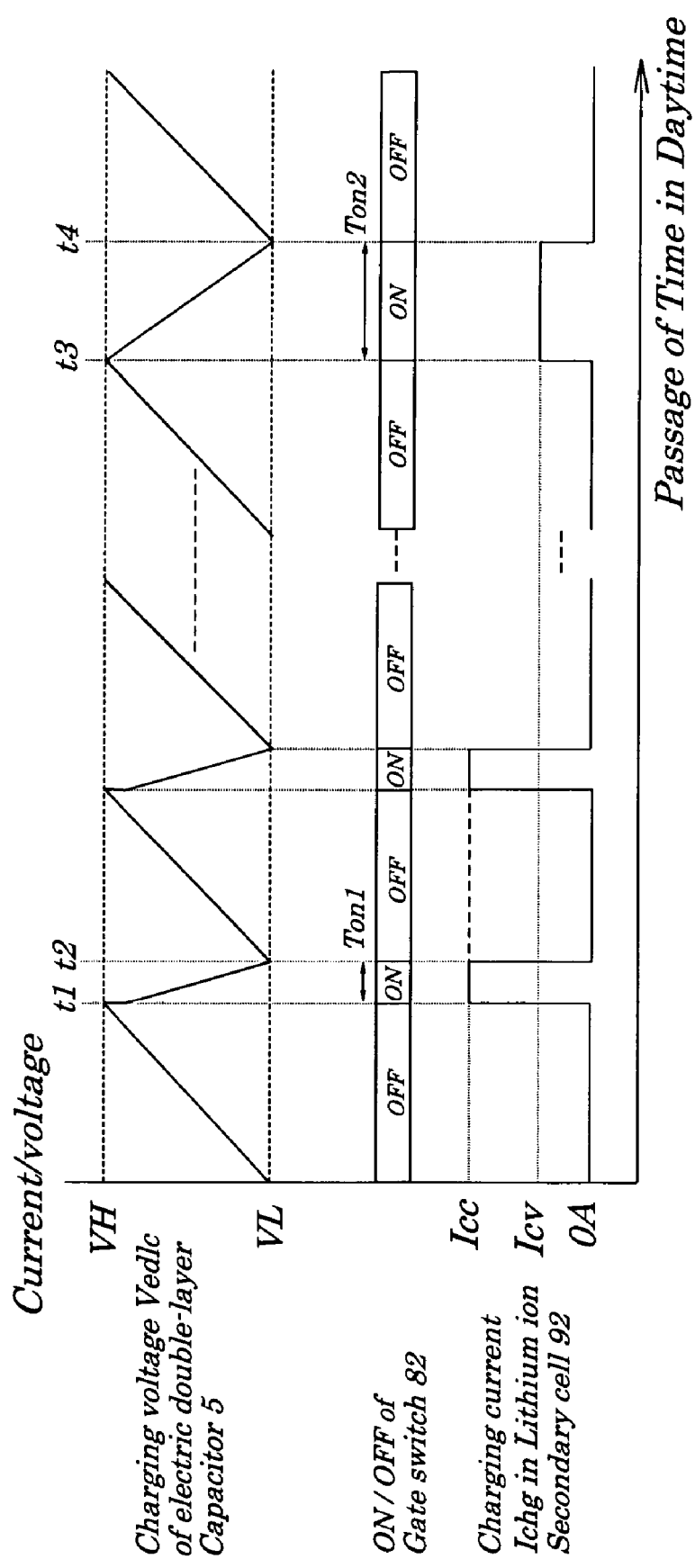
FIG. 8 is a timing chart explaining operations to be performed when a lithium ion secondary cell in the power source device of FIG. 1 is charged.
Figure 9:
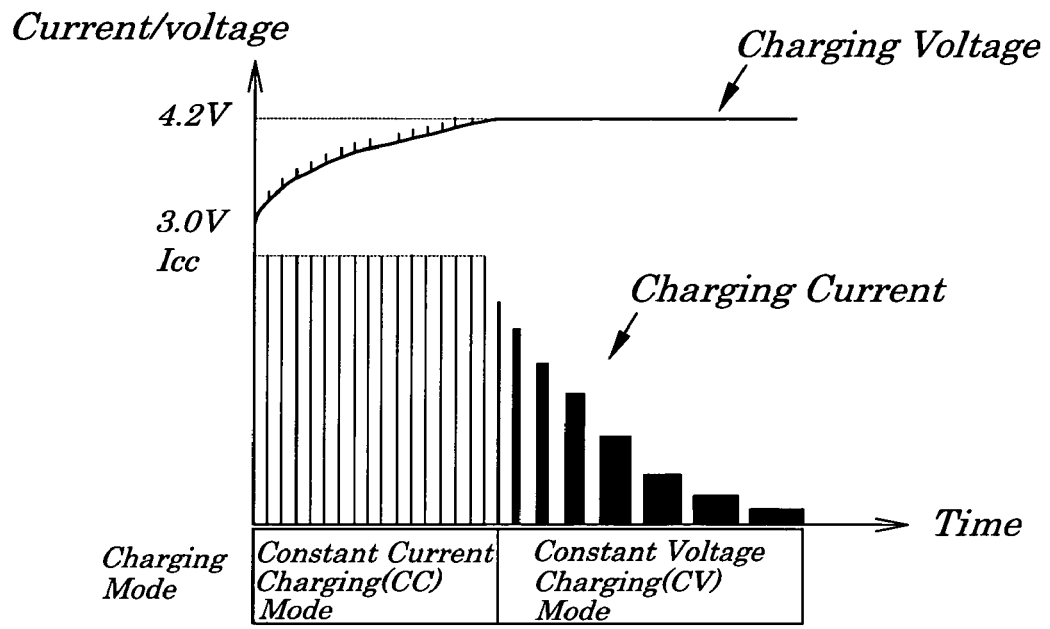
FIG. 9 is a graph showing a charging characteristic of the lithium ion secondary cell showing in FIG. 1.
Figure 10:
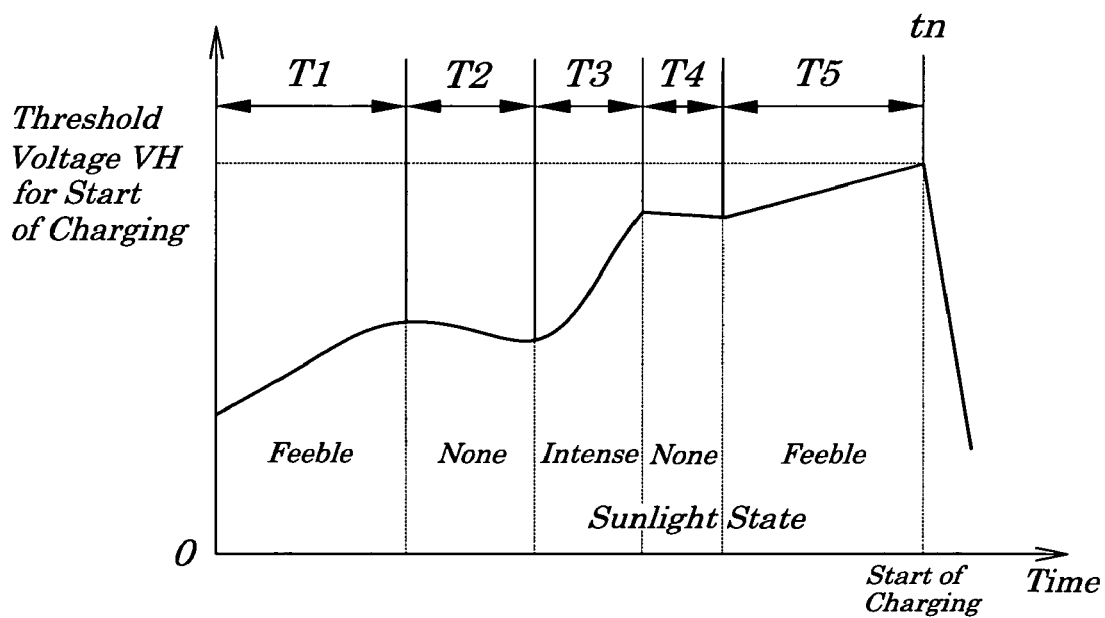
FIG. 10 is a graph showing a charging characteristic of an electric double-layer capacitor showing in FIG. 1.

FIG. 8 is a timing chart explaining operations to be performed when the lithium ion secondary cell 92 in the power source device of FIG. 1 is charged. FIG. 9 is a diagram showing a charging characteristic of the lithium ion secondary cell 92. FIG. 10 is a diagram showing a charging characteristic of the electric double-layer capacitor 5. A control method to be used in the power source device of the embodiment is explained by referring to FIGS. 8, 9, and 10. When the solar cell module 1 is irradiated with sunlight, power is stored in the electric double-layer capacitor 5 by an electric power generating operation of the solar cell module 1 through the first reverse-current preventing element 2 and the current limiting element 3 according to a voltage output characteristic to the intensity of sunlight, for example, as shown in FIG. 2. As shown in FIG. 8, when a charging voltage "Vedlc" in the electric double-layer capacitor 5 is at a threshold voltage "VL", since the contact "1" and contact "2" in the gate switch 82 are in an OFF state (disconnection state), the operation of charging the lithium ion secondary cell 92 is stopped, the circuits placed in a back-stage of the electric double-layer capacitor 5 are in a no-load state except for power consumption of the charge on/off controlling circuit 7 in the dormant state and, therefore, the electric double-layer capacitor 5 is in a charging mode and the charging voltage "Vedlc" is boosted up from the threshold voltage "VL" to a threshold voltage "VH". During this period, the gate switch 82 is held in an OFF state according to the holding operation shown in FIG. 7.

At a time t1, when a charging voltage "Vedlc" of the electric double-layer capacitor 5 reaches the threshold voltage "VH", a voltage output from the low voltage detector 721 becomes High and a voltage output from the high voltage detector 722 becomes High by operations of the capacitor voltage detecting circuit 72 of the charge on/off controlling circuit 7 and, therefore, a voltage output from the gate switch controlling circuit 73 becomes High and the contact "1" and contact "2" in the gate switch 82 are put in an ON state (connection state) by the controlling operations as shown in FIGS. 6 and 7. This causes the gate switch 82 to be in an ON state and starts the operation of charging the lithium ion secondary cell 92.

At this time, according to a charging voltage of the lithium ion secondary cell 92, a constant current charging mode or a constant voltage charging mode is selected by the charge voltage detecting means or device (not shown) of the charging method selecting switch 83. For example, when the constant current charging mode is selected as the charging mode, the contacts "z" and "x" in the charging method selecting switch 83 are connected to each other and the lithium ion secondary cell 92 is charged under a preset current value Icc. At this pint, charging current Ichg to be fed to the lithium ion secondary cell 92 is a current value that is too large to be supplied at an output impedance of the solar cell module 1 and, therefore, the electric double-layer capacitor 5 is put in a discharge mode and, at a discharging time Ton1, the charging voltage "Vedlc" to be fed to the electric double-layer capacitor 5 drops from the threshold voltage "VH" to the threshold voltage "VL". During this period, the gate switch 82 is held in an ON state by holding operations as shown in FIG. 7.

At a time t2, when the charging voltage "Vedlc" of the electric double-layer capacitor 5 again reaches the threshold voltage "VL", a voltage output from the low voltage detector 721 becomes Low and a voltage output from the high voltage detector 722 becomes Low by operations of the capacitor voltage detecting circuit 72 of the charge on/off controlling circuit 7 and, by the controlling operations as shown in FIGS. 6 and 7, a voltage output from the gate switch controlling circuit 73 becomes Low and the gate switch 82 is put in an ON state. As a result, the operation of charging the lithium ion secondary cell 92 is stopped and the circuits placed in a back-stage of the electric double-layer capacitor 5 are in a no-load state except for power consumption of the charge on/off controlling circuit 7 in the dormant state and, therefore, the electric double-layer capacitor 5 is again in a charging mode and the charging voltage "Vedlc" is boosted up from the threshold voltage "VL" to the threshold voltage "VH". During this period, the gate switch 82 is held in an OFF state by the holding operation shown in FIG. 7.

By repetition of the above operations, the lithium ion secondary cell 92 is periodically charged. When the lithium ion secondary cell 92 comes close to its fully-charged state and a preset charging voltage is reached, the constant voltage charging mode is selected by the charging voltage detecting means or device (not shown) of the charging method selecting switch 83. At this time, since the contacts "z" and "y" in the charging method selecting switch 83 are connected to each other and the lithium ion secondary cell 92 is charged under a preset voltage value, the charging current Ichg of the lithium ion secondary cell 92, at a time t3, becomes a value (for example, Icv) being smaller than the set current value Icc and, during a discharge time Ton2 to a time t4, the electric double-layer capacitor 5 is discharged and, as a result, the discharge time Ton2 is made longer than the discharge time Ton1.

As shown in FIG. 9, the lithium ion secondary cell 92 having had extremely small charging capacity of, for example, about 3V as its initial voltage is periodically charged under a first stage since its operation is in the constant current charging mode and, then, a voltage of the lithium ion secondary cell 92 is gradually boosted and, when the voltage has reached a preset voltage value (for example, 4.2 V), is again periodically charged since its operation is put in the constant voltage charging mode. A voltage of the lithium ion secondary cell 92 occurring during the constant current charging mode, in synchronization with periodic charging operations, is boosted due to internal impedance of the lithium ion secondary cell 92, while power applying time of the periodic charging current flowing during the operation in the constant voltage charging mode, as the lithium ion secondary cell 92 becomes close to a fully-charged state, is made longer due to the lengthened discharge period of the electric double-layer capacitor 5.

Since the solar cell module 1 exhibits such an output characteristic as shown in FIG. 2, when sunlight is intense (for example, at a time T3 as shown in FIG. 10), the charging voltage "Vedlc" of the electric double-layer capacitor 5 increases rapidly; however, when sunlight is feeble (for example, at times T1 and T5 as shown in FIG. 10), the charging voltage "Vedlc" increases gently and, when there is no sunlight at night (for example, times T2 and T4 as shown in FIG. 10), even if the electric double-layer capacitor 5 is in a no-load state, the charging voltage "Vedlc" decreases gently due to a leakage current of the electric double-layer capacitor 5 or due to consumption of power held in the charge on/off controlling circuit 7. When the charging voltage "Vedlc", after repetition of its increase and decrease, has reached the threshold voltage "VH" at a time "tn", charging of the lithium ion secondary cell 92 starts and the charging voltage "Vedlc" decreases rapidly. In this case, when a maximum output operating voltage or release voltage of the solar cell module 1 is set as a threshold voltage "VH" to be used for the start of charging the lithium ion secondary cell 92, in actuality, due to changes in weather, consumption of power held in the charge on/off controlling circuit 7, or a like, frequency with which the charging voltage "Vedlc" reaches the threshold voltage "VH" decreases and electric energy generated by the solar cell module 1 is held, for a long time, in only a state in which the energy is stored and, as a result, a period of operations of charging the lithium ion secondary cell 92 is made long and effective transfer of energy becomes impossible. Therefore, optimum settings of voltage threshold values VH and VL for sequential transfer of energy to the lithium ion secondary cell 92 and of the ESR 5b (Rx) and electrostatic capacitance 5a (Cx) in the electric double-layer capacitor 5 improve charging efficiency.

Also, as shown in FIG. 5, since the daily change in amounts of power generation in terms of time varies depending on a sunlight state, optimum setting of the threshold voltage "VH" to lengthen time occupied by the operation of charging the lithium ion secondary cell 92 in a day and optimum setting of the ESR 5b (Rx) and electrostatic capacitance 5a (Cx) in the electric double-layer capacitor 5 improve charging efficiency. Moreover, by setting the threshold voltage "VL" to be used to stop charging of the lithium ion secondary cell 92 at a value being as low as possible in order to enable charge energy to be supplied from the electric double-layer capacitor 5 as much as possible, the charging efficiency is improved.

In order to effectively charge the lithium ion secondary cell 92 in a manner to respond to changes in a sunlight state caused by a change in weather or position of a sun, or by a way of mounting the solar cell module 1, by setting the threshold voltage "VH" for the start of the operation of charging the lithium ion secondary cell 92 at a value being lower than a maximum output operating voltage of the solar cell module 1, even in a sunlight temperature environment in which sunlight is comparatively feeble or in a high temperature environment an output voltage of the solar cell module 1 decreases, the charging operation can be started. More specifically, the threshold voltage "VH" is set at a value being 90% or less of the maximum output operating voltage of the solar cell module 1. On the other hand, by setting the threshold voltage "VL" used to stop the operation of charging the lithium ion secondary cell 92 at a value being a lower limit value of an input voltage of the booster-type DC-DC converter 6, it is possible to take more charging energy of the electric double-layer capacitor 5. More specifically, the threshold voltage "VL" is 2 V or less. Moreover, in order to charge the lithium ion secondary cell 92 even in a stormy weather that changes momentarily, immediately after sunrise, immediately before sunset, by setting a charging period at a short period being shorter than an interval period of changes in the intensity of the sunlight, more particularly, at a time between several seconds to several minutes, even in an environment in which changes in sunlight are large, smooth operation of charging the lithium ion secondary cell 92 is performed to improve a charging operating ratio in a day.

For example, by applying the following conditions to be set with the equations (1) to (5), a typical charging period employed in the embodiment can be calculated.

[Operation Conditions]
ESR 5b of electrical double-layer capacitor 5; Rx=100 (m$\Omega$)
Electrostatic capacitance 5a of the electric double-layer capacitor 5; Cx=40 (mF)
Charging start threshold voltage; VH=5(V)
Charging stop threshold voltage; VL=2(V)
Charging current of lithium ion secondary cell 92;
Constant current (CC) mode Icc=0.1 (A)
Power generating current of solar cell module 1; Ip=0.05 (A)

[ESR Loss]

$$\text{Loss} = 0.1(A) \times 0.1(\Omega) = 0.01(V) \quad \text{Equation (1)}$$

[Charging Period of Electric Double-layer Capacitor 5]

$$T\text{off} = 0.04(F) \times |2(V) + 0.01(V) - 5(V)|/0.05(A) = 2.4(\text{sec}) \quad \text{Equation (2)}$$

[Discharging Period of Electric Double-layer Capacitor 5 (=Period of Charging Lithium Ion Secondary Cell 92)]

$$T\text{on} = 0.04(F) \times |5(V) - 0.01(V) - 2(V)|/0.1(A) = 1.2(\text{sec}) \quad \text{Equation (3)}$$

[Charging Period]

$$T = T\text{on} + T\text{off} = 1.2 + 2.4 = 3.6(\text{sec}) \quad \text{Equation (4)}$$

[Charging Duty]

$$D = T\text{on}/T = 1.2/3.6 = 33\% \quad \text{Equation (5)}$$

As a result from the above calculation using the equations (1) to (5), when 100 m$\Omega$ is set as the ESR 5b of the electric double-layer capacitor 5, 40 mF is set as the electrostatic capacitance 5a of the electric double-layer capacitor 5, and the solar cell module 1 having its power generating current Ip of 0.05 A is employed, a charging period becomes about 3.6 seconds. At this time, a charging duty ratio of the lithium ion secondary cell 92 is about 33%.

Moreover, the solar cell module 1 and electric double-layer capacitor 5 are connected in parallel and the impedance of the solar cell module 1 is estimated to be 10 Ω or more, which is one hundred times larger or more than the ESR 5b of the electric double-layer capacitor 5 and, therefore, an output from the solar cell module 1 is 1% or less, which is almost negligible. As a result, in the calculation of a discharge period of the electric double-capacitor 5, it is assumed that there is no solar cell module 1 in terms of electrical equivalence.

Thus, according to the first embodiment, the charge on/off controlling circuit 7 detects a voltage of the electric double-layer capacitor 5 and, when the detected voltage exceeds a threshold voltage "VH", holds a charge controlling signal (output signal of the terminal "Q") used to charge the secondary cell pack 9 in an active mode (at high level) to perform an operation of starting to charge the secondary cell pack 9 and then, when a voltage of the electric double-layer capacitor 5 reaches a threshold voltage "VL", holds a charge controlling signal in a non-active (low level) mode and performs an operation of stopping the charge, and the secondary cell charge controlling circuit 8, when the charge controlling signal is put in an active mode, charges the secondary cell pack 9 based upon power stored in the electric double-layer capacitor 5. Therefore, even in an environment in which power generated by the solar cell varies due to changes in sunlight intensity and/or ambient temperature, the secondary cell pack 9 can be charged in a stable manner. Also, since it is not necessary that the capacitor voltage detecting circuit 72 is located in the vicinity of the solar cell module 1, highly accurate generation of threshold voltages VH and VL enables a voltage to be detected with high accuracy without being affected by ambient temperatures of the solar cell module 1. Moreover, when a voltage of the secondary cell pack 9 is lower than a specified threshold voltage, the CC charge controlling circuit 84 charges the secondary cell pack 9 at a specified constant current and, when a voltage of the secondary cell pack 9 exceeds the specified threshold value, the CV charge controlling circuit 85 charges the secondary cell pack 9 at a specified constant voltage and, therefore, the secondary cell pack 9 can be charged with high efficiency without being affected by impedance of the secondary cell pack 9 and wirings.

Second Embodiment

Figure 11:
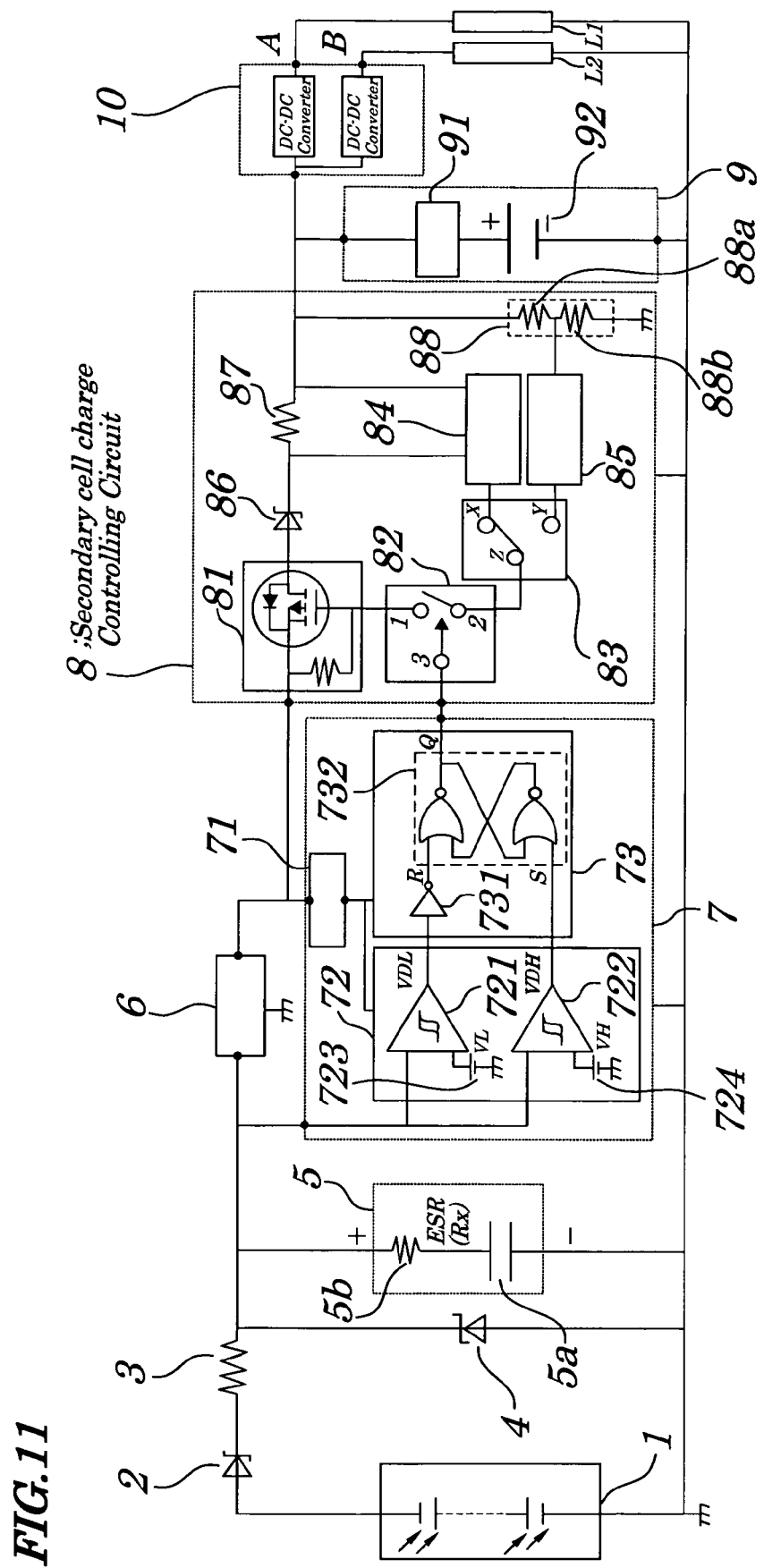
FIG. 11 is a schematic circuit diagram showing electric configurations of a power source device according to a second embodiment of the present invention.

FIG. 11 is a circuit diagram showing electric configurations of a power source device of a second embodiment of the present invention. In FIG. 11, same reference numbers are assigned to components having the same functions as those in FIG. 1. In the power source device of the second embodiment, an output converter 10 is mounted in a back-stage in a secondary cell pack 9 in FIG. 11. The output converter 10 is made up of a DC-DC converter 101 and a DC-DC converter 102. Input terminals of the DC-DC converters 101, 102 are commonly connected to a positive polarity terminal of the secondary cell pack 9. An output A of the DC-DC converter 101 is connected to a load L1; and an output B of the DC-DC converter 102 is connected to a load L2. Other configurations of the components have the same configurations as those in FIG. 1.

In the power source device of the second embodiment, as in the case of the first embodiment, electric energy converted from sun energy by the solar cell module 1 is stored as charging energy for an electric double-layer capacitor 5 and a lithium ion secondary cell 92 is charged periodically. By using the charging voltage of the lithium ion secondary cell 92, stabilized power is fed to the loads L1 and L2 from the DC-DC converters 101 and 102.

Third Embodiment

Figure 12:
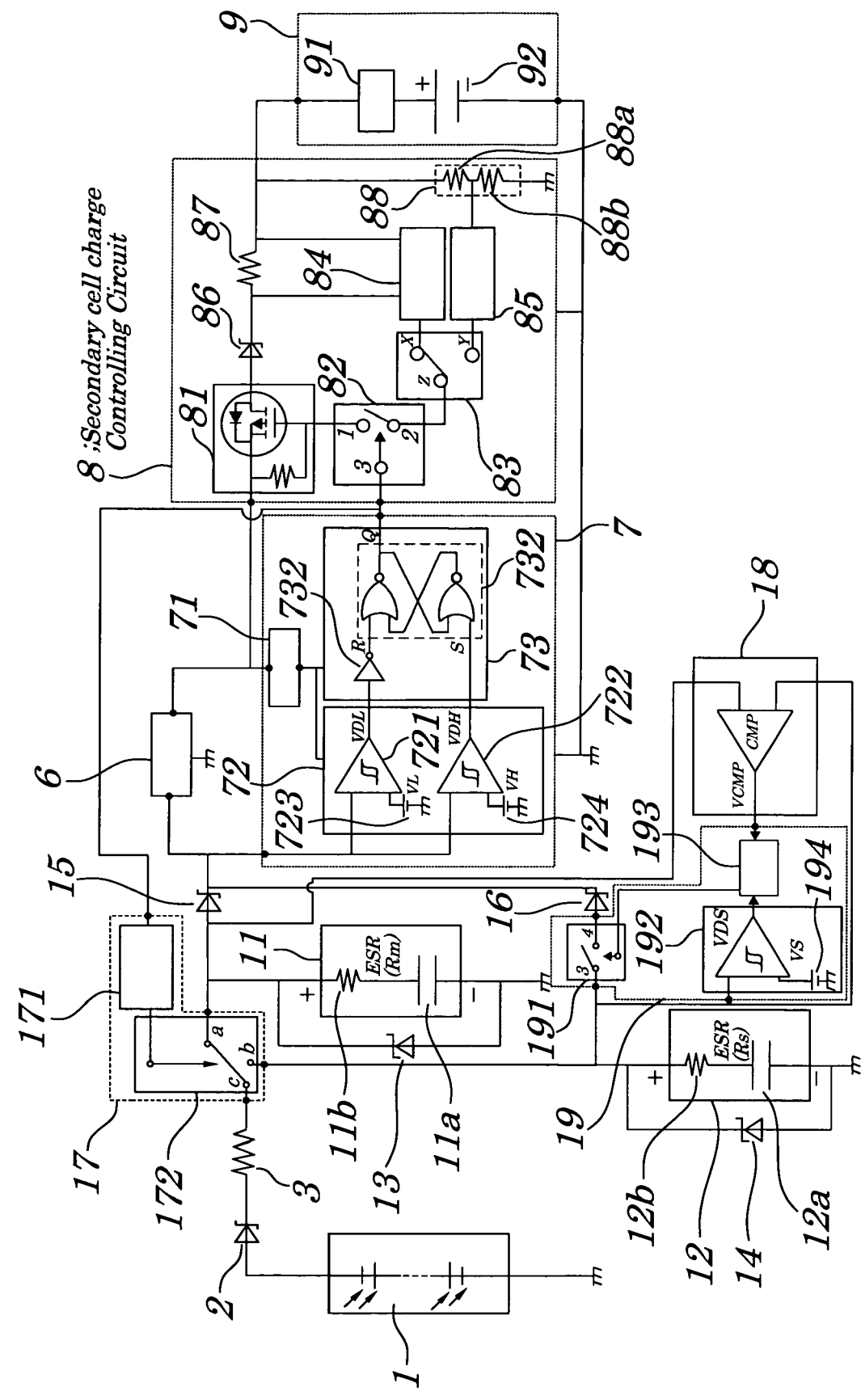
FIG. 12 is a schematic circuit diagram showing electrical configurations of a power source device according to a third embodiment of the present invention.

FIG. 12 is a circuit diagram showing electrical configurations of the power source device of a third embodiment of the present invention. In FIG. 12, same reference numbers are assigned to components having the same function as those in FIG. 1. The power source device of the third embodiment includes a solar cell module 1, a first reverse-current preventing element 2, a current limiting element 3, a booster-type DC/DC converter 6, a charge on/off controlling circuit 7, a secondary cell charge controlling circuit 8, a secondary cell pack 9, a main capacitor 11, a sub-capacitor 12, a main capacitor overvoltage protecting element 13 (device), a sub-capacitor overvoltage protecting element (device) 14, a main capacitor reverse-current preventing element 15, a sub-capacitor reverse-current preventing element (device) (device) 16, a charging capacitor selecting circuit 17, a capacitor charging voltage comparing circuit 18, and a sub-capacitor discharge controlling circuit 19. The main capacitor 11 has an ESR 11b and an electrostatic capacitance 11a, and the sub-capacitor 12 has an ESR 12b and electrostatic capacitance 12a. Each of the main capacitor 11 and sub-capacitor 12 is made up of an electric double-layer capacitor with low ESR (Equivalent Series Resistance) by being so configured as to be of a water-type in which a diluted sulfuric acid is used as an electrolysis solution or to be of an organic-type in which an organic electrolysis solution is used. Therefore, high output impedance being in the order of several tens of ohms at a practical output voltage of the solar cell module 1 is converted into low impedance being in the order of mΩ being less than 1Ω and an amount of electricity being equivalent to a product of electrostatic capacitance and charging voltage of the electric double-layer capacitor is stored and, as a result, power generated energy produced by the solar cell module 1 can be used as a low impedance power source.

The charging capacitor selecting circuit 17 is made up of a selection switch controlling circuit 171 and a selecting switch 172. The selection switch controlling circuit 171 controls the selecting switch 172 according to a selection switch control signal "w" (output from a gate switch controlling circuit 73). The selecting switch 172 has contacts "c", "a", and "b". The capacitor charging voltage comparing circuit 18 is made up of a comparator (CMP) to compare a voltage of the main capacitor 11 with a voltage of the sub-capacitor 12 and to output a switch controlling signal "VCMP".

The sub-capacitor discharge controlling circuit 19 includes a discharge switch 191, a sub-capacitor voltage detecting circuit 192, and a discharge switch controlling circuit 193. The discharge switch 191 has a control terminal, contact 3 and contact 4. The sub-capacitor voltage detecting circuit 192 has a Vsub detector to compare a voltage of the sub-capacitor 12 with a threshold voltage "VS" of a reference voltage source 194 to output a switch controlling signal "VDS". The Vsub detector has a hysteresis characteristic. The discharge switch controlling circuit 193 controls the discharge switch 191 according to the switch controlling signal "VDS" or the switch controlling signal "VCMP".

Figure 13:
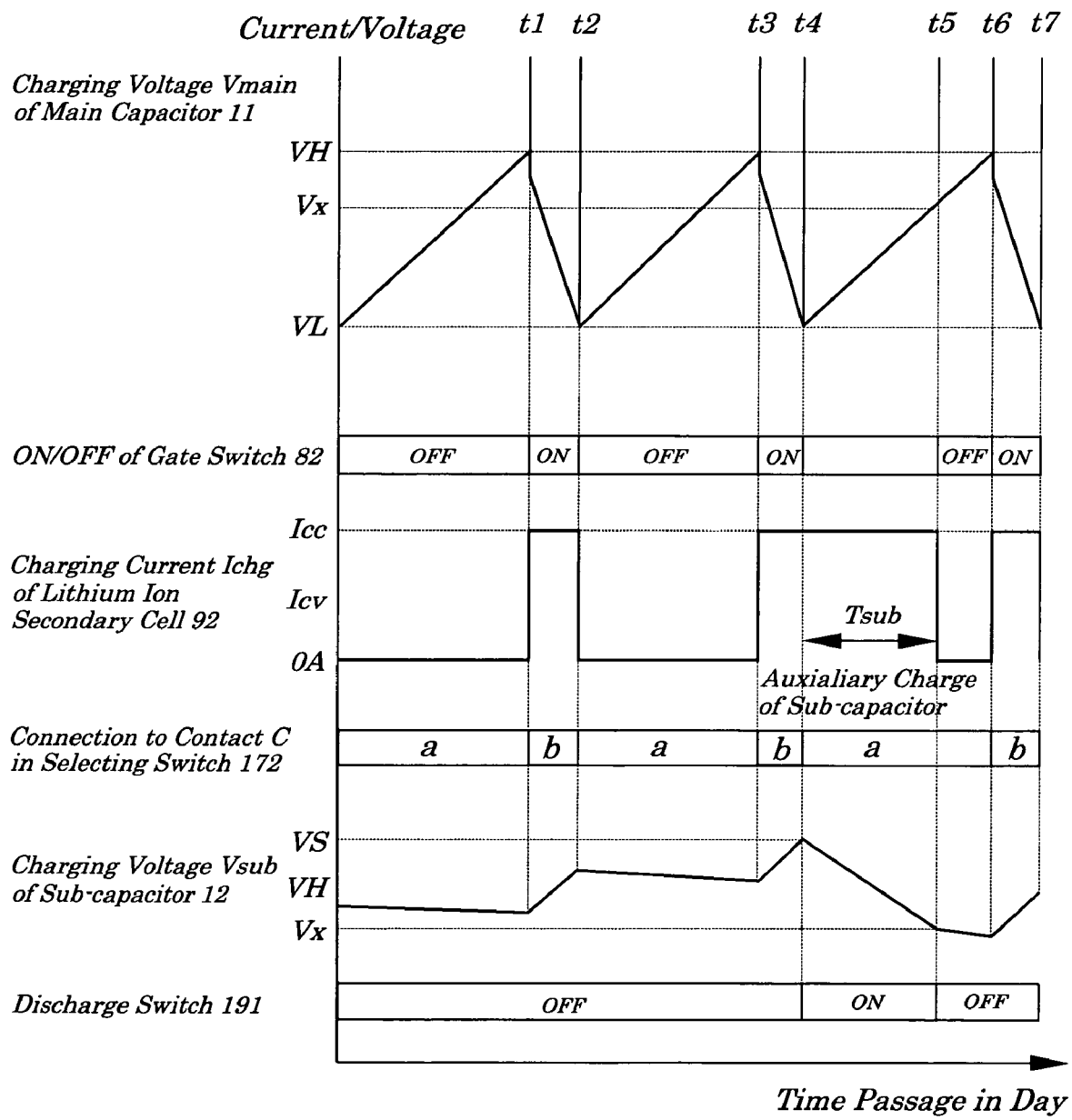
FIG. 13 is a timing chart explaining operations performed while a lithium ion secondary cell in the power source device of FIG. 12 is being charged.

FIG. 13 is a timing chart explaining operations performed while a lithium ion secondary cell 92 in the power source device of FIG. 12 is being charged. The control method to be used in the power source of the third embodiment is described by referring to FIG. 13. In the case in which the contact "c" of the selecting switch 172 making up the charging capacitor selecting switch 17 is connected to its contact "a" as an initial state, when the solar cell module 1 is irradiated with sunlight, accumulation of power in the main capacitor 11 is started through the first reverse-current preventing element 2 and the current limiting element 3 by a power generating operation of the solar cell module 1 based on the output characteristic that varies depending on sunlight intensity as shown in FIG. 2

As shown in FIG. 13, when a charging voltage Vmain of the main capacitor 11 is at a threshold voltage "VL", since a gate switch 82 is in an OFF state and an operation of charging the lithium ion secondary cell 92 is stopped and, therefore, circuits in a back stage of the main capacitor 11 is in a no-load state except for power consumption of the charge on/off controlling circuit 7 in the dormant state and, therefore, the main capacitor 11 is put into a charging mode and the charging voltage Vmain is boosted from the threshold voltage "VL" to a threshold voltage "VH". During this period, the gate switch 82 is held in an OFF state according to a holding operation shown in FIG. 7. At this time, since the discharge switch 191 of the sub-capacitor discharge controlling circuit 19 is in an OFF state, a charging voltage "Vsub" drops gradually from an initial charging voltage by consumption of power held in the controlling circuits (capacitor charging voltage comparing circuit 18 and sub-capacitor discharge controlling circuit 19) attached to the sub-capacitor 12.

At a time t1, when a charging voltage "Vmain" of the main capacitor 11 reaches the threshold voltage "VH", a voltage output from a low voltage detector 721 becomes High and a voltage output from a high voltage detector 722 becomes High by operations of a capacitor voltage detecting circuit 72 of the charge on/off controlling circuit 7 and, therefore, a voltage output from the gate switch controlling circuit 73 becomes High and the gate switch 82 is put in an ON state by the controlling operations as shown in FIGS. 6 and 7. This causes the operation of charging the lithium ion secondary cell 92 to be started. In this case, as in the case of the first embodiment, either of the constant current charging mode or constant voltage charging mode is selected by a charging voltage of the lithium ion secondary cell 92. For example, in the case of the constant current charging mode, contacts "z" and "x" in a charging method selecting switch 83 are connected to each other and the lithium ion secondary cell 92 is charged under a preset current value Icc. At this time, the charging current Ichg to be fed to the lithium ion secondary cell 92 is a current value that is too large to be supplied by output impedance of the solar cell module 1 and, therefore, the main capacitor 11 is put in a discharge mode and the charging voltage Vmain drops from the threshold voltage "VH" to the threshold voltage "VL". During this period, the gate switch 82 is held in an ON state by holding operations as shown in FIG. 7.

When the operation of charging the lithium ion secondary cell 92 is started, by a selection switch control signal "w" fed from an output terminal of the charge on/off controlling circuit 7, the selection switch controlling circuit 171 in the charging capacitor selecting circuit 17 controls the selecting switch 172 so that its contact "c" is connected to its contact "b". The connection between the contacts "c" and "b" causes the operation of charging the sub-capacitor 12 to be started and the increase in the charging voltage "Vsub" to begin. This contact state is held during the period of operations of charging the lithium ion secondary cell 92.

At a time t2, when a charging voltage "Vmain" of the main capacitor 11 again reaches the threshold voltage "VL", a voltage output from the low voltage detector 721 becomes Low and a voltage output from the high voltage detector 722 becomes Low by operations of the capacitor voltage detecting circuit 72 of the charge on/off controlling circuit 7 and, therefore, a voltage output from the gate switch controlling circuit 73 becomes Low and the gate switch 82 is put in an OFF state by the controlling operations as shown in FIGS. 6 and 7. This causes the operation of charging the lithium ion secondary cell 92 to be stopped. Then, by a selection switch control signal "w" fed from an output terminal of the charge on/off controlling circuit 7, the selection switch controlling circuit 171 in the charging capacitor selecting circuit 17 controls the selecting switch 172 so that its contact "c" is connected to its contact "a". The connection between the contacts "c" and "a" causes the operation of charging the main capacitor 11 to be started and the rise in the charging voltage "Vmin" to be started. At this time, since the discharge switch 191 in the sub-capacitor discharge controlling circuit 19 is in an OFF state, the charging voltage "Vsub" of the sub-capacitor 12 drops gradually from its initial charging voltage by consumption of power held in the capacitor charging voltage comparing circuit 18 and sub-capacitor discharge controlling circuit 19 attached to the sub-capacitor 12.

At a time t3, when a charging voltage "vmain" of the main capacitor 11 again reaches the threshold voltage "VH", a voltage output from the low voltage detector 721 becomes High and a voltage output from the high voltage detector 722 becomes High by operations of the capacitor voltage detecting circuit 72 of the charge on/off controlling circuit 7 and, therefore, a voltage output from the gate switch controlling circuit 73 becomes High and the gate switch 82 is put in an ON state by the controlling operations as shown in FIGS. 6 and 7. This causes the operation of charging the lithium ion secondary cell 92 to be again started. At this time, by a charging voltage of the lithium ion secondary cell 92, either the constant current charging mode or constant voltage charging mode is selected. For example, in the case of the constant current charging mode, the contacts "z" and "x" in the charging method selecting switch 83 are connected to each other and the lithium ion secondary cell 92 is charged under a preset current value Icc. At this time, the charging current Ichg to be fed to the lithium ion secondary cell 92 is a current value that is too large to be supplied by output impedance of the solar cell module 1 and, therefore, the main capacitor 11 is put in a discharge mode and the charging voltage Vmain drops from the threshold voltage "VH" to the threshold voltage "VL". During this period, the gate switch 82 is held in an ON state by holding operations as shown in FIG. 7.

When the operation of charging the lithium ion secondary cell 92 is again started, by a selection switch control signal "w" fed from an output terminal of the charge on/off controlling circuit 7, the selection switch controlling circuit 171 in the charging capacitor selecting circuit 17 controls the selecting switch 172 so that its contact "c" is connected to its contact "b". The connection between the contacts "c" and "b" causes the operation of charging the sub-capacitor 12 to be started and the rise in the charging voltage "Vsub" to be started. At a time t4, when the charging voltage "Vsub" reaches a predetermined threshold voltage "VS" being higher than the threshold voltage "VH", the sub-capacitor voltage detecting circuit 192 making up the sub-capacitor discharge controlling circuit 19 transmits a switch controlling signal "VDS" to the discharge switch controlling circuit 193 and puts the discharge switch 191 into an ON state. As a result, instead of a voltage from the main capacitor 11, a voltage from the sub-capacitor 12 is fed to the charge on/off controlling circuit 7. Therefore, the lithium ion secondary cell 92 stops charging operations by being controlled by the main capacitor 11 and then starts charging operations by being controlled by the sub-capacitor 12. At this time, the charging voltage of the main capacitor 11 becomes lower than the charging voltage of the sub-capacitor 12, however, the main capacitor reverse-current preventing element 15 prevents a discharge current of the sub-capacitor 12 from flowing into the main capacitor 11 and the lithium ion secondary cell 92 is charged.

Due to a rise in the charging voltage Vmain of the main capacitor 11 by power generation of the solar cell module 1 and a drop in the charging voltage "Vsub" of the sub-capacitor 12 by charging the lithium ion secondary cell 92, at a time t5, when these charging voltages "Vmain" and "Vsub" reach a voltage value "Vx", the capacitor charging voltage comparing circuit 18 transmits a switch controlling signal "VCMP" to the discharge switch controlling circuit 193 and puts the discharge switch 191 into an OFF state. By a discharge operation in which the charging voltage "Vsub" of the sub-capacitor 12 drops from "VS" to "Vx", the lithium ion secondary cell 92 is charged and auxiliary charge during the period "Tsub" is made possible. This enables the lithium ion secondary cell 92 to be effectively charged.

By repetition of the above operations, the lithium ion secondary cell 92 is periodically charged according to two periods of a discharge period of the main capacitor 11 and a discharge period of the sub-capacitor 12. When the lithium ion secondary cell 92 comes close to its fully-charged state and a preset charging voltage is reached, the constant voltage charging mode is selected. At this time, the contacts "z" and "y" in the charging method selecting switch 83 are connected to each other and the lithium ion cell 92 is charged under a preset voltage and, therefore, the charging current becomes smaller than the current Icc and discharge time of the main capacitor 11 and sub-capacitor 12 becomes longer.

Thus, according to the third embodiment, by the discharge operations in which the charging voltage "Vsub" of the sub-capacitor 12 drops from "VS" to "Vx", the lithium ion secondary cell 92 is charged and, therefore, the auxiliary charge during the period "Tsub" is made possible and the lithium ion secondary cell 92 is more effectively charged compared with the first embodiment.

It is apparent that the present invention is not limited to the above embodiments but may be changed and modified without departing from the scope and spirit of the invention. For example, instead of circuit configurations used in the charge on/off controlling circuit 7, other configurations may be employed so long as the configurations have the same functions. The charge controlling switch 81 may be made up of not only pMOS but also a bipolar transistor and other driving circuits having a same function as that of the bipolar transistor may be attached.

In the power source device of the present invention, since a secondary cell such as the lithium ion secondary cell employed in the information terminal device or a like can be charged by sunlight energy that can be supplied on a semi-permanent basis, information terminal devices can be operated even in a place or region where no power infrastructure is provided. Therefore, the power source device of the present invention can be used as a power source for, for example, wireless network systems, ubiquitous terminals, unattended monitoring systems, or a like.

What is claimed is:

1. A power source device comprising:
a solar cell module;
an electric double-layer capacitor;
a first reverse-current preventing element and a current limiting element connected in series between the solar cell module and the electric double-layer capacitor;
an overvoltage protecting element connected in parallel with the electric double-layer capacitor;
a secondary cell pack;
a secondary cell charge controlling circuit connected to the secondary cell pack for controlling a charging current or voltage to the secondary cell pack, the secondary cell charge controlling circuit including a charge controlling switch and a gate switch, the charge controlling switch controlling a charging current to the secondary cell pack;
a DC Direct Current-DC converter connected in series with the electric double-layer capacitor and the charge controlling switch of the secondary cell charge controlling circuit to supply an electric current for charging the secondary cell pack; and
a charge on/off controlling circuit connected to the electric double-layer capacitor and controlling the secondary cell charge controlling circuit, the charge on/off controlling circuit including a capacitor detecting circuit and a gate switch controlling circuit powered by the DC-DC converter, the capacitor detecting circuit including a low voltage detector and a low voltage threshold VL reference voltage source, a high voltage detector and a high voltage threshold VH reference voltage source wherein VL<VH, when the charging voltage of the electric double-layer capacitor is lower than the threshold voltage "VL", a Low signal having a low level is output from an output terminal VDL of the low voltage detector and, when the charging voltage of the electric double-layer capacitor is higher than the threshold voltage "VL", a High signal having a high level is output from an output terminal VDH of the high voltage detector, the threshold voltage "VL" having a hysteresis in a range between VL(−) and VL(+) and, when the charging voltage of the electric double-layer capacitor is lower than the threshold voltage "VH", a Low signal is output from the output terminal VDL of the low voltage detector and when the charging voltage of the electric double-layer capacitor is higher than the threshold voltage "VH" a High signal is output from an output terminal VDH of the high voltage detector, the threshold voltage "VH" having a hysteresis in a range between VH(−) and VH(+), the gate switch controlling circuit including a set/reset flip-flop circuit and responsive to a signal from the VDL terminal to be reset and responsive to a signal from the VDH terminal to be set, an output of the set/reset flip-flop controlling the gate switch of the secondary cell charge controlling circuit.

2. The power source device according to claim 1, wherein the secondary cell charge controlling circuit further includes:
a charging method selecting switch connected to the charge controlling switch by the gate switch;
a second reverse-current preventing element and a charging current detecting element connected in series between the charge controlling switch and the secondary cell pack;
a charging voltage detecting element connected in parallel with the secondary cell pack;
a CC Constant Current charge controlling circuit connected to a first terminal of the charging method selecting switch, the CC charge controlling circuit being responsive to the charging current detecting element to control a current level of a gate of the charge controlling switch so that a charging current detected by the charging current detecting element becomes a specified constant current; and a CV Constant Voltage charge controlling circuit connected to a second termnal of the charging method selecting switch, the CV charge controlling circuit being responsive to the charging voltage detecting element to control a voltage level of the gate of the charge controlling switch so that a charging current detected by the charging voltage detecting element becomes a specified constant voltage, wherein the secondary cell charge controlling circuit can be put in states of three types of operations depending on a state of the switches including the gate switch and the charging method selecting switch.

3. A power source device according to claim 1, further comprising:

an output converter mounted in a back-stage in a secondary cell pack, the output converter including a second DC-DC converter and a third DC-DC converter, input terminals of the second and third DC-DC converters being commonly connected to a positive polarity terminal of the secondary cell pack;

a first load connected to an output of the second DC-DC converter; and a second load connected to an output of the third DC-DC converter, wherein stabilized power is fed to the first and second loads from the second and third DC-DC converters.

4. The power source device according to claim 3, wherein the secondary cell charge controlling circuit further includes:

a charging method selecting switch connected to the charge controlling switch by the gate switch;

a second reverse-current preventing element and a charging current detecting element connected in series between the charge controlling switch and the secondary cell pack;

a charging voltage detecting element connected in parallel with the secondary cell pack;

a CC Constant Current charge controlling circuit connected to a first terminal of the charging method selecting switch, the CC charge controlling circuit being responsive to the charging current detecting element to control a current level of a gate of the charge controlling switch so that a charging current detected by the charging current detecting element becomes a specified constant current; and a CV Constant Voltage charge controlling circuit connected to a second termnal of the charging method selecting switch, the CV charge controlling circuit being responsive to the charging voltage detecting element to control a voltage level of the gate of the charge controlling switch so that a charging current detected by the charging voltage detecting element becomes a specified constant voltage, wherein the secondary cell charge controlling circuit can be put in states of three types of operations depending on a state of the switches including the gate switch and the charging method selecting switch.

5. A power source device according to claim 1, wherein the electric double layer capacitor comprises a main capacitor and a sub-capacitor, and wherein the overvoltage protecting device comprises a main capacitor overvoltage protecting element and a sub-capacitor overvoltage protecting element, and the reverse-current preventing element comprises a main capacitor reverse-current preventing element and a sub-capacitor reverse-current preventing element, the power source device further comprising:

a charging capacitor selecting circuit, the charging capacitor selecting circuit comprising a selection switch controlling circuit and a selecting switch, the selection switch controlling circuit controlling the selecting switch according to a selection switch control signal output from the charge on/off controlling circuit;

a capacitor charging voltage comparing circuit, the capacitor charging voltage comparing circuit comprising a comparator to compare a voltage of the main capacitor with a voltage of the sub-capacitor and to output a switch controlling signal; and a sub-capacitor discharge controlling circuit, the sub-capacitor discharge controlling circuit comprising a discharge switch, a sub-capacitor voltage detecting circuit, and a discharge switch controlling circuit the discharge switch having a control terminal first and second contacts, the sub-capacitor voltage detecting circuit having a Vsub detector to compare a voltage of the sub-capacitor with a threshold voltage "VS" of a reference voltage source to output a switch controlling signal "VDS" to the discharge switch, wherein the Vsub detector has a hysteresis characteristic.

6. The power source device according to claim 5, wherein the secondary cell charge controlling circuit further includes:

a charging method selecting switch connected to the charge controlling switchby the gate switch;

a second reverse-current preventing element and a charging current detecting element connected in series between the charge controlling switch and the secondary cell pack;

a charging voltage detecting element connected in parallel with the secondary cell pack;

a CC Constant Current charge controlling circuit connected to a first terminal of the charging method selecting switch, the CC charge controlling circuit being responsive to the charging current detecting element to control a current level of a gate of the charge controlling switch so that a charging current detected by the charging current detecting element becomes a specified constant current; and a CV Constant Voltage charge controlling circuit connected to a second termnal of the charging method selecting switch, the CV charge controlling circuit being responsive to the charging voltage detecting element to control a voltage level of the gate of the charge controlling switch so that a charging current detected by the charging voltage detecting element becomes a specified constant voltage, wherein the secondary cell charge controlling circuit can be put in states of three types of operations depending on a state of the switches including the gate switch and the charging method selecting switch.

* * * * *